C. PETERS.
REAGENTS FOR TESTING THE STRENGTH OF VINEGAR.
No. 169,727. Patented Nov. 9, 1875.
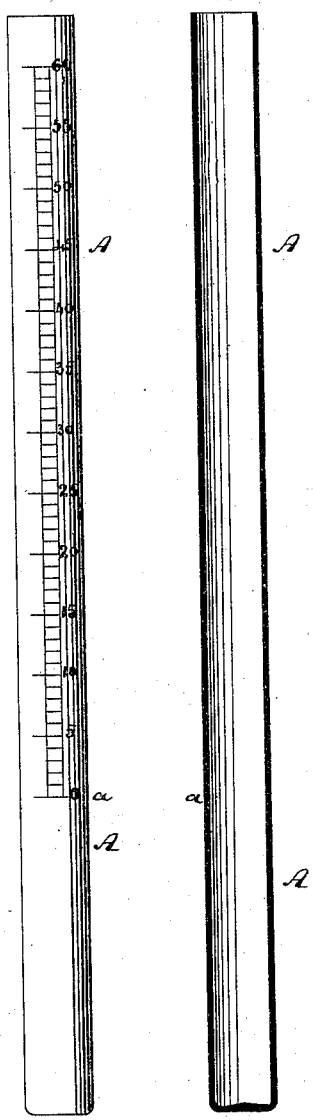

UNITED STATES PATENT OFFICE.

CHARLES PETERS, OF MECHANICSVILLE, VIRGINIA, ASSIGNOR TO CHARLES BOESE & CO., OF NEW YORK, N. Y.

IMPROVEMENT IN REAGENTS FOR TESTING THE STRENGTH OF VINEGAR.

Specification forming part of Letters Patent No. 169,727, dated November 9, 1875; application filed September 4, 1875.

*To all whom it may concern:*

Be it known that I, CHARLES PETERS, of Mechanicsville, Hanover county, State of Virginia, have invented a new and Improved Method of Testing Vinegar, of which the following is a specification:

Figure 1 is a side view, and Fig. 2 a central longitudinal section, of the instrument or acetometer used in carrying my invention into effect.

Similar letters of reference indicate corresponding parts in both figures.

The object of this invention is to devise a simple and economical means of ascertaining the proportion of acetic acid contained in vinegar.

The vinegar in the market is bought and sold by the grain—that is, by the number of grains of soda which an ounce of vinegar will neutralize.

The most primitive way of testing vinegar is to add soda until the liquid ceases to change the color of litmus-paper. Another method has been devised by Professor Otto, of Germany, and consists in first pouring a given quantity of tincture of litmus into a graduated tube, then pouring a given quantity of vinegar into said tube, the mixture producing a red liquid that reaches to zero in the tube. Aqua ammonia is next added, until the liquid assumes a blue color. The scale on the tube now shows how much aqua ammonia has been used, and from this the amount of acid in the vinegar is readily computed.

The first primitive method requires very nice handling. The soda must be heated to expel all moisture, and agitation of the vinegar in inserting the soda must be avoided to guard against waste. In short, the process is so intricate that ordinary merchants or their employés cannot employ it with any certainty of success.

The process of Professor Otto is, in the first place, not adapted to the trade in the United States, because it shows the percentage of acid in the vinegar, whereas dealers want to know the grain of the vinegar—*i. e.*, the number of grains of soda which an ounce of vinegar will neutralize; but Otto's process is principally objectionable because it requires the exact mixture of three separate liquids. If, after the tincture of litmus has been poured into the tube to its proper mark, a little too much vinegar should be added, so that it will stand above its mark, the whole process must be started anew, since in pouring out the surplus vinegar, some of the litmus would go with it, and the required proportion of liquids consequently be destroyed.

Now, my invention consists of a new composition, that contains all the necessary elements for testing the vinegar, and in the new process of testing the vinegar, by pouring upon it, into a graduated tube, so much of the testing liquor as will be discolored by the vinegar.

The tube A (shown in the drawing) is closed at the bottom and opened on top. At a certain distance from the bottom it has a mark, *a*, which indicates the height to which the vinegar to be tested should reach. Above the mark *a* the tube A is graduated into sixty, more or less, equal spaces or degrees, as shown. These measure the quantity of liquid which the vinegar beneath *a* is capable of discoloring, and are calculated with reference to the grain-scale of vinegar in vogue in the market. Thus, if the testing liquid should reach to the mark 35 before it ceases to be discolored, it indicates that the vinegar in the bottom of the tube below the line *a* is thirty-five-grain vinegar—or, in other words, that one ounce of such vinegar would neutralize thirty-five grains of soda.

The testing liquid used by me is composed of the following ingredients, in the proportions set forth, to wit: One-half pound of litmus; one pound concentrated liquid ammonia; one quart alcohol, and sufficient pure water to make in all seventeen quarts.

This tincture has a blue color, and is turned red by the vinegar, when poured into the tube A until so much has been poured in that the vinegar can no longer discolor or neutralize it. The contents of the tube then show the blue color.

It will be observed that by the use of my mixture I am enabled to measure the strength of vinegar with absolute certainty, by the mere addition of one liquid to the pure vinegar, which was never done before my invention. Otto first had to color his vinegar, and then added the testing liquor.

I claim as my invention—

The composition of litmus, concentrated ammonia, alcohol, and water, substantially in the proportions set forth, for the purpose specified.

<div style="text-align: right;">CHARLES PETERS.</div>

Witnesses:
  J. W. ANDERSON,
  FRANK E. ANDERSON.